(12) United States Patent
Lad

(10) Patent No.: US 11,047,244 B2
(45) Date of Patent: Jun. 29, 2021

(54) ROTOR BLADE ARRANGEMENT

(71) Applicant: ROLLS-ROYCE plc, London (GB)

(72) Inventor: Bharat M Lad, Nottingham (GB)

(73) Assignee: ROLLS-ROYCE plc, London (GB)

( * ) Notice: Subject to any disclaimer, the term of this patent is extended or adjusted under 35 U.S.C. 154(b) by 63 days.

(21) Appl. No.: 16/654,450

(22) Filed: Oct. 16, 2019

(65) Prior Publication Data

US 2020/0149421 A1 May 14, 2020

(30) Foreign Application Priority Data

Nov. 12, 2018 (GB) .................................... 1818347

(51) Int. Cl.
*F01D 5/30* (2006.01)

(52) U.S. Cl.
CPC ............ *F01D 5/30* (2013.01); *F05D 2220/32* (2013.01); *F05D 2230/60* (2013.01); *F05D 2250/71* (2013.01)

(58) Field of Classification Search
CPC ........ F01D 5/30; F01D 25/04; F05D 2230/60; F05D 2250/71; F05D 2220/32; F04D 29/666; F04D 29/321
See application file for complete search history.

(56) References Cited

U.S. PATENT DOCUMENTS

| | | | |
|---|---|---|---|
| 4,474,534 A | 10/1984 | Thode | |
| 5,236,307 A * | 8/1993 | Ng | F04D 27/0246 416/147 |
| 5,966,525 A * | 10/1999 | Manzi, Jr. | F01D 5/06 703/8 |
| 9,470,091 B2 * | 10/2016 | Gomez | F01D 5/146 |
| 2004/0101405 A1 * | 5/2004 | Turner | F01D 5/141 415/194 |
| 2006/0010686 A1 | 1/2006 | Henning et al. | |
| 2006/0013692 A1 | 1/2006 | Henning et al. | |
| 2006/0188374 A1 | 8/2006 | Mickol et al. | |
| 2008/0075592 A1 | 3/2008 | Lee et al. | |
| 2008/0134685 A1 * | 6/2008 | Bunker | F23R 3/20 60/776 |
| 2010/0247310 A1 | 9/2010 | Kelly et al. | |

(Continued)

FOREIGN PATENT DOCUMENTS

| | | |
|---|---|---|
| EP | 0870903 A2 | 10/1998 |
| EP | 1617042 A2 | 1/2006 |

(Continued)

OTHER PUBLICATIONS

Non-Patent Literature "The Impact of Uncertain Stagger Angle Variation on High-Pressure Compressor Rotor Performance" by Zheng et al. (Year: 2017).*

(Continued)

*Primary Examiner* — Shafiq Mian
(74) *Attorney, Agent, or Firm* — Oliff PLC

(57) ABSTRACT

A bladed disc comprising a disc hub; a set of blades angularly distributed around the disc hub; wherein there is variation in a geometric parameter between the blades. The blades are positioned around the disc hub such that for a majority of pairs of neighbouring blades in the set, an interval between values of the geometric parameter between the blades of the pair is less than 0.5 standard deviations of the geometric parameter for the set of blades.

17 Claims, 5 Drawing Sheets

(56) References Cited

U.S. PATENT DOCUMENTS

2011/0318172 A1* 12/2011 Hoeger .................. F01D 5/142
                                                    415/181
2018/0171803 A1*  6/2018 Lafitte .................... F01D 5/282

FOREIGN PATENT DOCUMENTS

| EP | 1884624 A2 | 2/2008 |
| GB | 2054058 A  | 2/1981 |
| GB | 2423341 A  | 8/2006 |

OTHER PUBLICATIONS

Zheng, Siyu et al.; "The Impact of Uncertain Stagger Angle Variation on High-Pressure Compressor Rotor Performance;" Global Power & Propulsion Society; Oct. 31, 2017; vol. GPPS-2017-00405; pp. 1-7.
Mar. 17, 2020 Search Report issued in European Patent Application No. 19203076.
Apr. 16, 2019 Search Report issued in Great Britain Patent Application No. GB1818347.5.

* cited by examiner

ROTOR BLADE ARRANGEMENT

CROSS-REFERENCE TO RELATED APPLICATIONS

This specification is based upon and claims the benefit of priority from United Kingdom patent application number GB 1818347.5 filed on Nov. 12, 2018, the entire contents of which are incorporated herein by reference.

BACKGROUND

Field of the Disclosure

The disclosure relates to the circumferential arrangement of rotor blades around a rotor.

Description of the Related Art

Gas turbine engines comprise a number of compressor stages and a number of turbine stages. Typically, each stage comprises a row of rotor blades (which may be referred to simply as a rotor) and a row of stator vanes. The row of rotor blades and the row of stator vanes may be axially offset from each other. In use, the rotor stages rotate about an engine axis.

The rotor blades of the rotor may be manufactured separately to a rotor hub into which they are fixed in order to form the rotor. Although each rotor blade is designed, and intended, to have the same properties, manufacturing tolerances mean that there is typically small but measurable differences in the structural properties of the blades.

SUMMARY

According to a first aspect of the disclosure there is provided a bladed disc comprising:
 a disc hub; and
 a set of blades angularly distributed around the disc hub;
  wherein there is variation in a geometric parameter between the blades; and
  wherein the blades are positioned around the disc hub such that for a majority of pairs of neighbouring blades in the set, an interval between values of the geometric parameter between the blades of the pair is less than 0.5 standard deviations of the geometric parameter for the set of blades.

The set of blades may comprise a rising subset of at least three neighbouring blades in which there is an increasing trend of the geometric parameter in a first angular direction around the disc hub. The set of blades may comprise a falling subset of at least three neighbouring blades in which there is a decreasing trend of the geometric parameter in the first angular direction.

Each blade in the rising subset may have a higher value of the geometric parameter than its previous neighbour in the rising subset. Each blade in the falling subset may have a lower value of the geometric parameter than its previous neighbour in the falling subset.

Each blade in the set of blades may belong to either a rising subset or a falling subset. Some blades may belong to both a rising subset and a falling subset.

The rising subset may include a blade having a value of the geometric parameter less than a median value of the geometric parameter in the set of blades, and a blade having a value of the geometric parameter more than the median value. The falling subset may include a blade having a value of the geometric parameter less than the median value, and a blade having a value of the geometric parameter more than the median value.

There may be a single rising subset and a single falling subset in the set of blades, and the angular gaps between all neighbouring blades in the set of blades sum to 360°.

A maximum interval in the geometric parameter between two neighbouring blades in the set of blades may be 100% or less of a standard deviation of the geometric parameter in the set of blades, for example 75% or less, or 50% or less.

The geometric parameter may be a stagger angle of the blade. A stagger angle is an angular offset of the chord of the blade at a radially-outer tip of the blade relative to a reference axis which is parallel to an engine centreline in use. The stagger angle may be measured about an intersection point of the reference axis and the chord of the blade. The reference axis may lie in a radial plane extending from the engine centreline and a root axis of the blade. There may be an intersection point of the reference axis and the chord of the blade along the chord of the blade, for example at a midpoint of the chord or a mean aerodynamic chord. The angular offset may be measured in a tangent plane intersecting the reference axis and normal to a radial axis relative the engine centreline, which may extend through the blade, for example at the root.

The stagger angle may be an untwisted stagger angle corresponding to a centrifugal loading condition of the blade.

The geometric parameter may be selected from the group consisting of:
 a stagger angle of the blade, such as an untwisted stagger angle corresponding to a centrifugal loading condition of the blade;
 a thickness of the blade at one or more predetermined measurement points, for example at a trailing edge portion, at a mean aerodynamic chord, or at a leading edge portion;
 a camber line angle at the trailing edge;
 a camber line angle at the leading edge
 a curvature of a suction surface of the blade; and
 a curvature of a pressure surface of the blade.

According to a second aspect of the disclosure there is provided a gas turbine engine comprising a bladed disc in accordance with the second aspect. The gas turbine engine may comprise a fan, a compressor stage and/or a turbine stage comprising the bladed disc.

According to a third aspect of the disclosure there is provided a method of assembling a bladed disc, the method comprising the steps of:
 providing a set of blades;
 determining a geometric parameter of each blade of the set of blades;
 determining assembly positions around a disc hub for each blade of the set of blades of the plurality, based on the geometric parameter; and
 assembling each blade of the set of blades in its respective assembly position to provide a bladed disc of the first aspect.

A superset of blades may be provided containing the set of blades. A respective value of the geometric parameter may be determined for each blade of the superset. The method may comprise selecting the set of blades from the superset for assembly around the disc hub.

The geometric parameter may be determined whilst each respective blade is in a centrifugal loading condition.

The geometric parameter may be determined by modal analysis of the blade.

In some examples, the geometric parameter may be a simulated geometric parameter of the blade in a centrifugal loading condition, and the simulated geometric parameter may be simulated based on a relationship with one or more measured geometric or structural parameters of the blade in an unloaded condition.

The one or more measured geometric parameters may be selected from the group consisting of:
- a stagger angle of the blade;
- a thickness of the blade at one or more predetermined measurement points, for example at a trailing edge portion, at a mean aerodynamic chord, or at a leading edge portion;
- a camber line angle at the trailing edge;
- a camber line angle at the leading edge
- a curvature of a suction surface of the blade; and
- a curvature of a pressure surface of the blade.

In other examples, the geometric parameter may be obtained directly (rather than by simulation or relation with other parameters), and may be selected from the group consisting of:
- a stagger angle of the blade, such as an untwisted stagger angle corresponding to a centrifugal loading condition of the blade;
- a thickness of the blade at one or more predetermined measurement points, for example at a trailing edge portion, at a mean aerodynamic chord, or at a leading edge portion;
- a camber line angle at the trailing edge;
- a camber line angle at the leading edge
- a curvature of a suction surface of the blade; and
- a curvature of a pressure surface of the blade.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1} K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bling. Any suitable method may be used to manufacture such a bladed disc or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
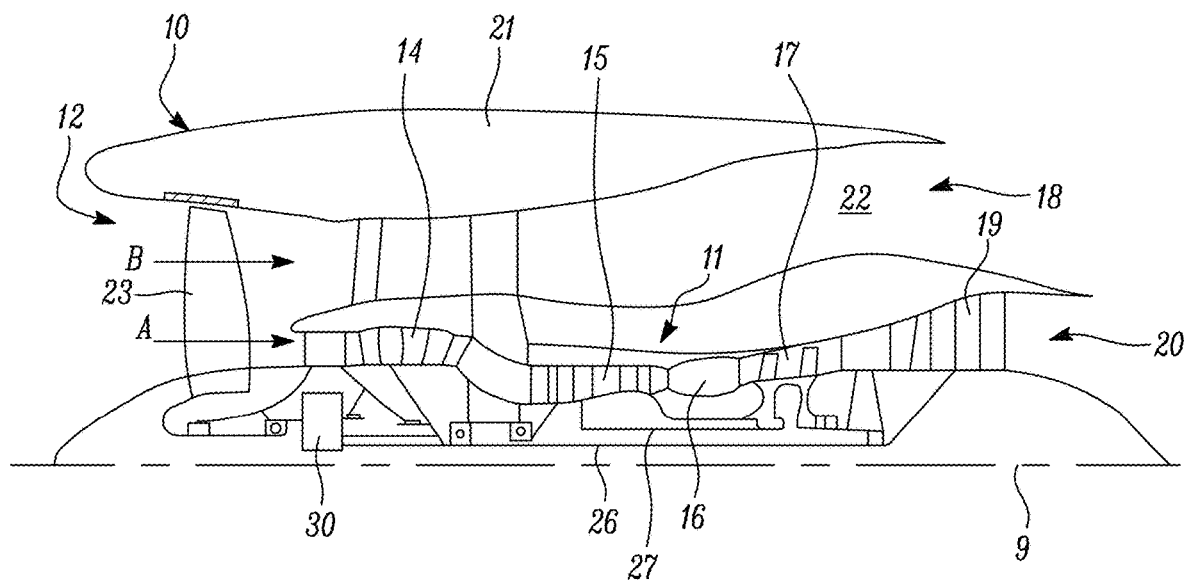
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
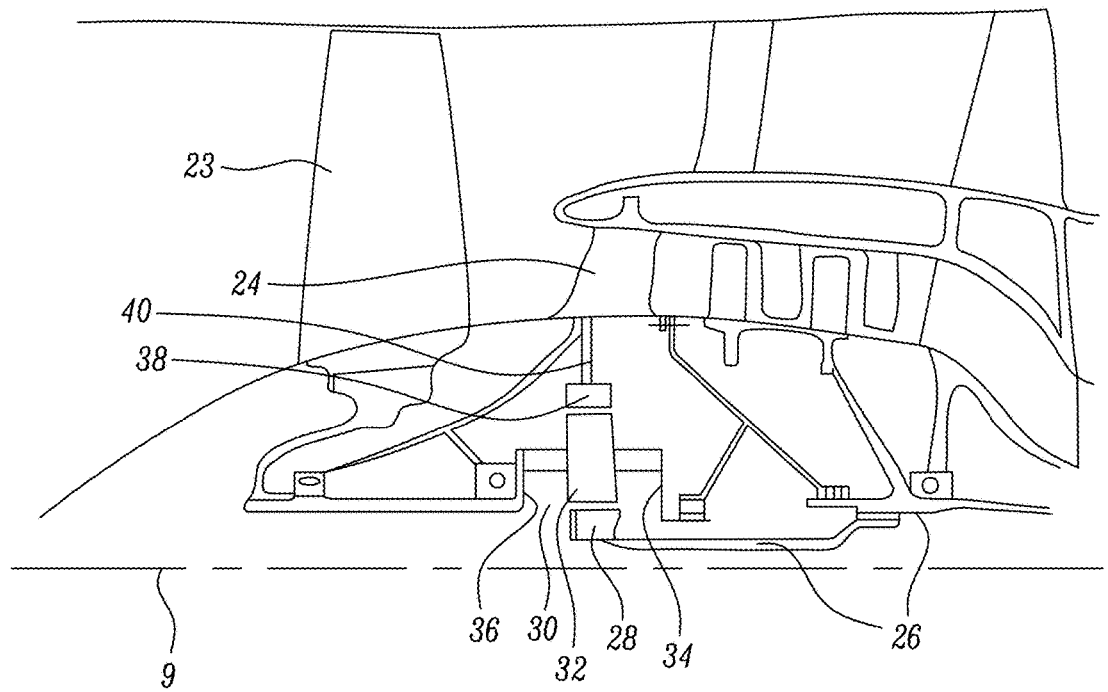
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
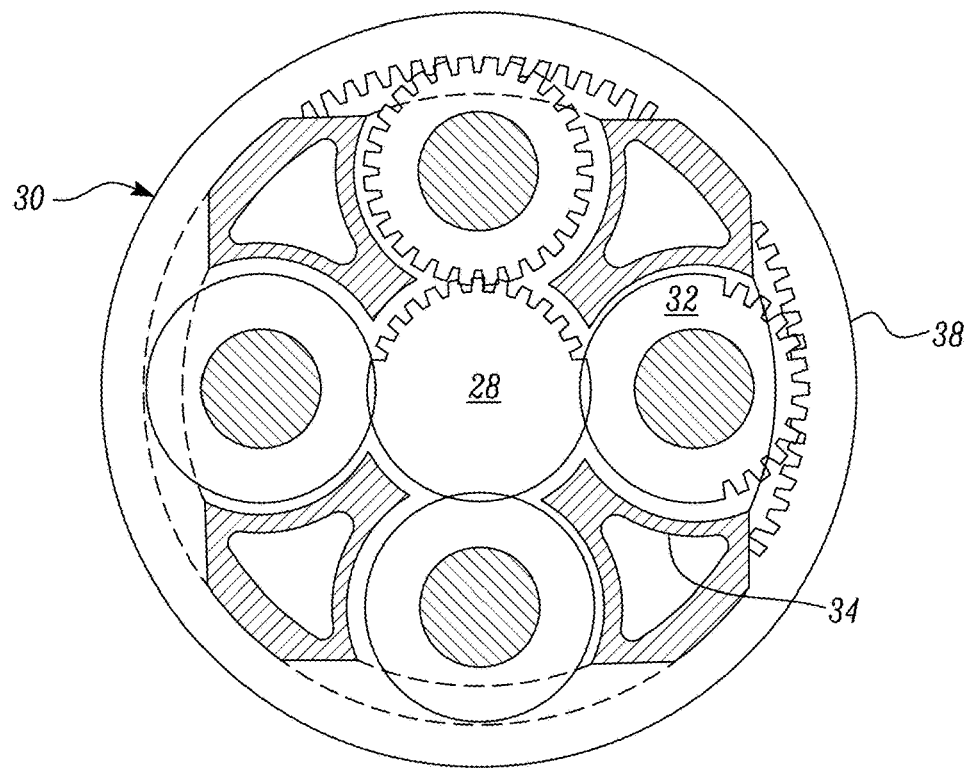
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
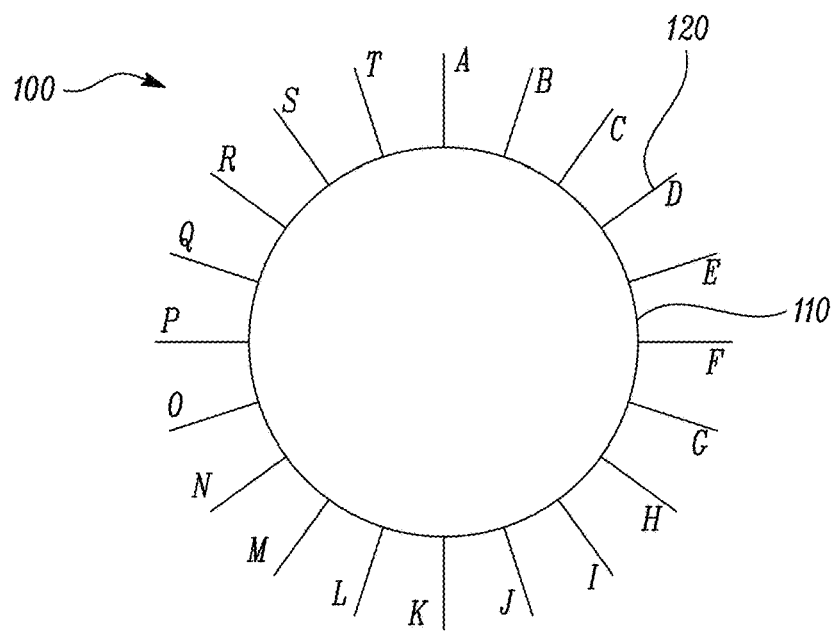
FIG. 4 is a schematic frontal view of a rotor comprising a disc hub and a plurality of blades installed in respective blade positions around the hub.

FIG. 4 is a schematic of a gas turbine engine rotor 100 having a plurality of rotor blades 120 attached to a disc hub 110. The rotor blades 120 are circumferentially arranged around the disc hub 110, with equal circumferential spacing between each pair of neighbouring blades. The circumferential position of each rotor blade 120 around the disc hub 110 is labelled A-T, as shown in FIG. 1.

The disclosure relates to the circumferential arrangement of rotor blades to a disc hub to reduce differences in a geometric parameter between neighbouring blades.

Examples of the disclosure are described below with respect to an example geometric parameter of angular mistagger. However, the invention is applicable to other geometric parameters as will be described below.

Mistagger relates to the angular amount by which a twist of the blade deviates from a design twist. Twist of the blade at any particular spanwise location of the blade relates to the angular offset of a line (a chord) passing through the leading and the trailing edge of the blade, relative to the rotational axis of a disc hub on which the blade is attached, which generally corresponds to the engine centreline. The twist is measured in a plane normal to a radial direction intersecting the blade, for example a radial direction intersecting a root of the blade, or a radial direction intersecting a chord of the blade at any particular spanwise location along the blade: for example the mean aerodynamic chord at mid-span, or the centre of the chord at the tip.

Mistagger is an example of a geometric parameter which may vary from blade to blade, but the effects of which may be minimised by suitable arrangement of the blades around the disc hub, as is the subject of this disclosure. In particular, an effect of mistagger is that the passage area and profile between two adjacent blades may deviate from the intended design. Such deviations may be particularly pronounced when there is a significant difference in the mistagger of adjacent blades. For example, a first blade may have a positive mistagger and its neighbour may have a negative mistagger. The disclosure relates to minimising such effects that depend on the geometric parameters of adjacent blades by arranging blades with similar deviations in the geometric parameter next to one another. For example, blades having a similar mistagger may be arranged adjacent one another, such that even when there is a significant discrepancy in the stagger of the individual blades, the passage area and profile between them is similar to the design condition.

Examples disclosed herein which relate to mistagger of blades refer to the twist of a blade at the tip, measured in a plane normal to a radial direction intersecting an angular centre of a root of the blade. Blade roots are typically secured in a disc hub by virtue of having a dovetail or fir tree shape as is known in the art, which may be secured in the disc hub by slotting into the disc hub along an axial direction. The angular centreline of such a disc hub is defined by a radial plane which bisects the root into equal halves.

Figure 5:
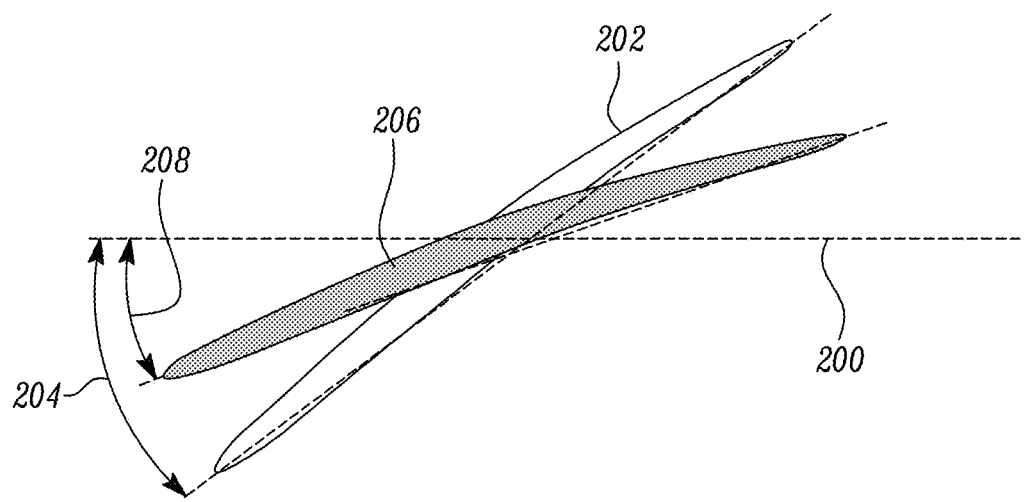
FIG. 5 is a schematic chord-wise cross-sectional view of a tip of a rotor blade in two twist conditions.

FIG. 5 shows tip cross-sections of a blade in two configurations of twist, relative to an engine centreline 200. A first configuration corresponding to a cold twist of the blade is shown in unshaded cross-section 202. Cold twist 204 is the amount of twist when the blade is stationary. In this example, the design cold twist of the blade (i.e. the designed amount of twist when the blade is stationary) is 30 degrees, whereas the manufactured cold twist of the blade (i.e. the actual measured twist of the blade) is 30.4 degrees. The manufactured cold twist 204 is shown in FIG. 5.

A second configuration corresponding to a hot twist of the blade is shown in shaded cross-section 206. Hot twist 208 is the amount of twist when the blade is rotating at predetermined operating conditions. As is known in the art, blades tend to untwist when rotated owing to aerodynamic loading and centrifugal loads on the blade.

Accordingly, hot twist may also be referred to as an untwisted stagger angle corresponding to a centrifugal loading condition of the blade. In this example, the design hot twist of the blade (i.e. the designed amount of twist when the blade is at the predetermined operating conditions) is 25 degrees, whereas the manufactured hot twist of the blade (i.e. the actual measured twist of the blade at those same conditions) is 25.4 degrees. The manufactured hot twist 208 is shown in FIG. 5.

Cold twist and hot twist may be related to each other, such that a geometric variation of the blade (i.e. relative to a design geometry but within manufacturing and performance tolerances) that results in deviation in a manufactured cold twist (i.e. from design cold twist) may correspond to a deviation in manufactured hot twist (i.e. from design hot twist). Other geometric or structural variation of the blade from design conditions may result in a change in the untwisting behaviour of the blade when rotated, such that a deviation in manufactured hot twist (i.e. from design hot twist) may be more pronounced than any deviation in manufactured cold twist.

For example, factors which may affect the untwisting behaviour of the blade include the geometric compliance of the blade (e.g. the conformance of the blade as manufactured to the design net shape) and the structural properties of the blade (e.g. the flexural rigidity and modal response of the blade). Geometric compliance of the blade may be measured, for example, by determining a thickness of the blade at one or more predetermined measurement points, for example at a trailing edge portion, at a mean aerodynamic chord, or at a leading edge portion of the blade. Structural properties of the blade may relate to the geometric properties of the blade (i.e. the net shape of the blade), and may also relate to internal and mechanical properties. In the case of composite blades, such properties may relate to, amongst other things, the ply structure, the presence or absence of forming defects (e.g. wrinkles) in the ply structure, material properties (which may be dependent on a curing process or completeness), and the dominant modal frequencies and diameters of the blade.

Accordingly, whilst the examples below relate to mistagger as an example geometric parameter that may be determined to serve as the basis for distributing rotor blades around a disc hub, it should be noted that other example geometric parameters or structural that influence mistagger may alternatively be determined and serve as the basis for distributing rotor blades around a disc hub. For example, there may be a correlation with a modal frequency of the rotor blades.

Yet further, in other examples different geometric parameters or structural parameters that may be unrelated to mistagger but may directly or indirectly correspond to other geometric parameters of interest may be determined and may serve as the basis for distributing rotor blades around a disc hub. For example, such geometric parameters may relate to wake angle of a blade, or shock position on a blade. A geometric parameter related to wake angle may be the curvature or angular orientation of the blade (e.g. the camber line angle) at the trailing edge, or the trailing edge thickness, as these parameters are strongly correlated to the wake angle of a blade. It may be desirable to have similar wake angles from adjacent passages to improve the uniformity of the flow into the next stage of the machine. A geometric parameter related to the shock position on a blade may be the curvature of the suction surface of the blade. The shock position corresponds to the location of a shock in the passage between two adjacent blades. The shock position is closely related to the force distribution on the blades, such that it may be desirable to have similar shock positions in neighbouring passages so as to minimise differences in the forces experienced by adjacent blades, which may influence flex of the blades and their aeroelastic response. Other example geometric parameters that may be determined and used as a basis for distributing blades around a disc hub may include a camber line angle at the leading edge, and a curvature of a pressure surface of the blade.

Figure 6:
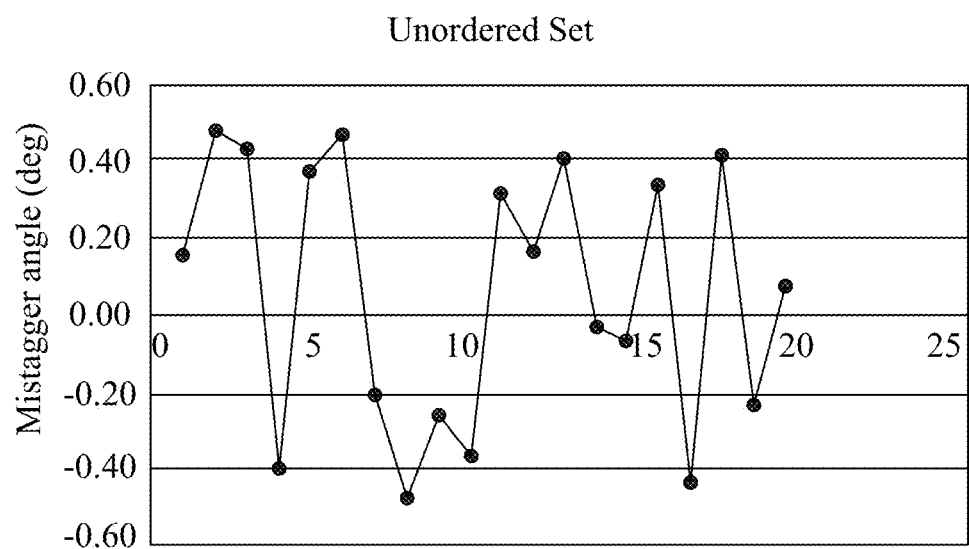
FIGS. 6-8 are plots of a geometric parameter (mistagger) for a set of blades as unordered, ordered, and patternised.

FIG. 6 is plot showing mistagger angle for a set of 20 blades for assembly onto a disc hub, such as the schematic disc hub 110 of FIG. 4 in positions A-T. As shown in FIG. 6, the mistagger angle varies between the blades, relative to a design stagger angle from between approximately −0.5 degrees to +0.5 degrees. The standard deviation of the mistagger is 0.34. If the blades were assembled in the order displayed in the graph such that the blade identified as 1 on the x-axis is installed in position A and the blade identified as 2 on the x-axis is installed in position B and so forth, then the maximum difference in the stagger angle between adjacent blades in the assembled rotor would be 0.85 between the blades in positions Q and R (numbered 17 and 18). Further, 9 pairs of adjacent blades would have a difference in the stagger angle between them which is greater than the standard deviation of the set of blades, and 14 blades would have a difference in the stagger angle between them which is greater than 0.5 standard deviations (i.e. greater than 0.17).

Figure 7:
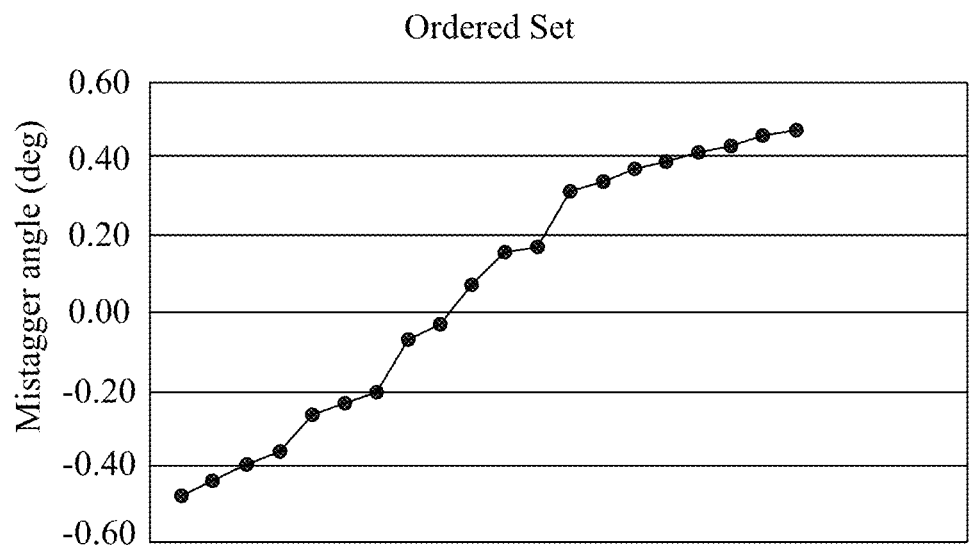

FIG. 7 is a plot showing the blades ordered in sequence according to their mistagger. Despite the random variation in the mistagger between the blades, there is a fairly continuous distribution of mistagger between the blades of the set.

Figure 8:
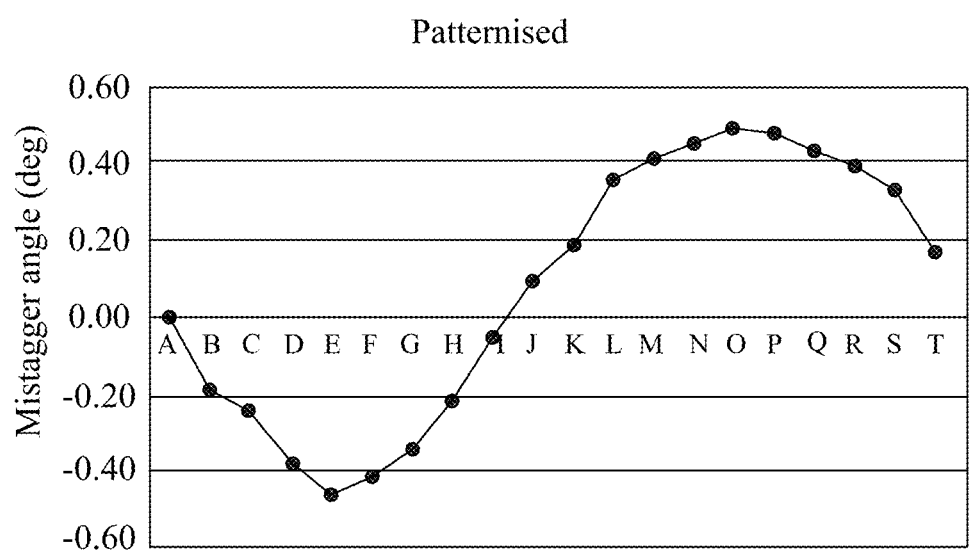

FIG. 8 is a plot showing the blades allocated to positions A-T such that the difference between adjacent blades is minimised. This is referred to as a patternised set of blades, as the blades have been arranged in a particular pattern based on a geometric parameter. As the rotors form an infinite angular sequence, the blades are not simply arranged in order of mistagger (as shown in FIG. 7), as this would result in a large discrepancy between blades T and A. Instead, in this example the blades are arranged so that the pattern of the mistagger resembles a falling and rising wave around the disc hub, and in particular resembles a sine wave.

In this particular example, the maximum difference in the stagger angle between any pair of adjacent blades in the patternised set is only 0.18 degrees. Only 2 pairs of adjacent blades have a difference in the stagger angle between them which is greater than 0.5 standard deviations, and no pairs adjacent blades have a difference in the stagger angle between them which is greater than the standard deviation.

Accordingly, by patternising the blades as described herein, it is possible to minimise the interval in a geometric parameter between adjacent blades such that for the majority of blades in the set, the interval is less than 0.5 standard deviations. The patternised set of blades as shown in FIG. 8 includes a rising subset of neighbouring blades over which there is an increasing trend of the geometric parameter (mistagger), and a falling subset of neighbouring blades over which there is a decreasing trend of the geometric parameter. In particular, the rising subset extends from position E to position O in ascending position order (i.e. E, F, G, ..., O), whereas the falling subset extends from position O to position E (including wrapping around from position T to position A). This particular example shows an unbroken succession of increases in the geometric parameter between blades in the rising subset, and likewise an unbroken succession of decreases in the geometric parameter between blades in the falling subset, such that each blade in the rising subset has a higher value of the geometric parameter than its previous neighbour within the rising subset, and each blade in the falling subset has a lower value of the geometric parameter than its previous neighbour in the falling subset. However, in other examples there may be localised decrease in the geometric parameter within a sub-portion of the rising subset, or a localised increase in the geometric parameter within a sub-portion of the falling subset, provided that the subset as a whole manifests a rising or falling trend.

Figure 9:
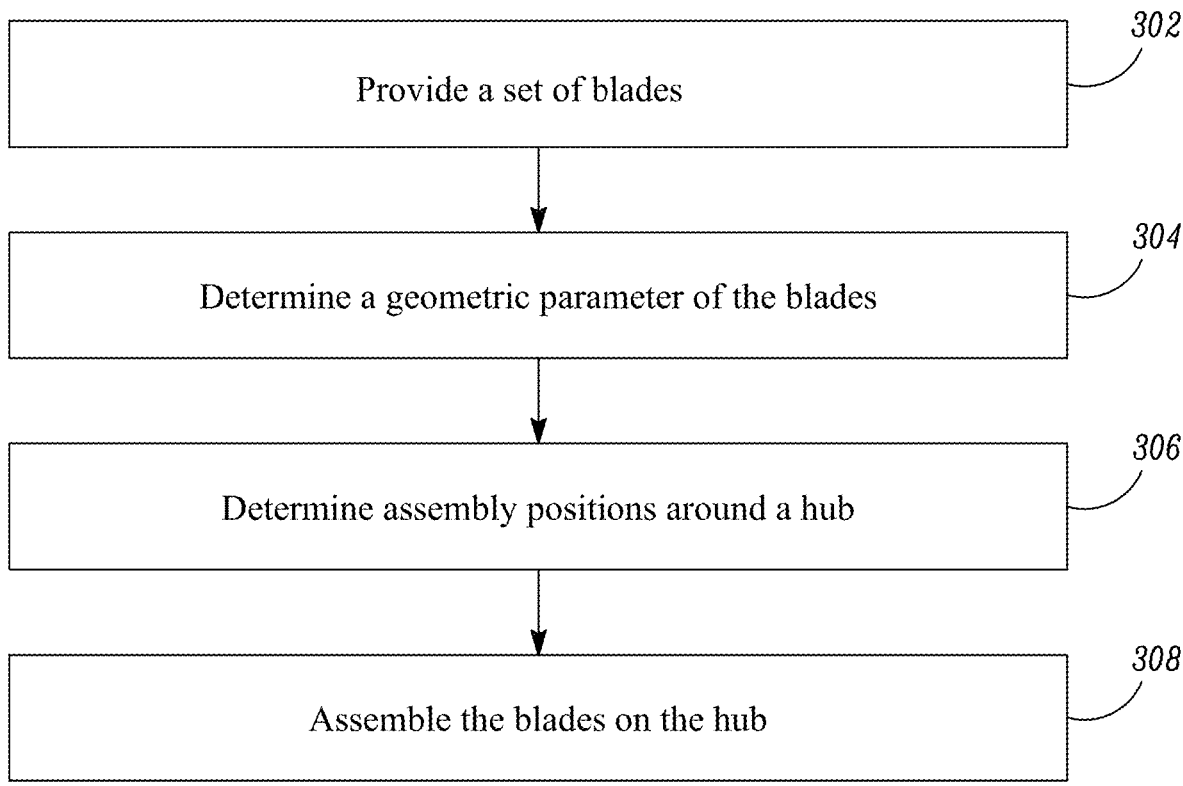
FIG. 9 is a flow diagram showing a method of patternising a set of blades for assembly on a rotor.

In the particular example of FIG. 9, all blades in the set of blades belongs to either a rising subset or a falling subset, with blades in positions E and O belonging to both as they mark the end points of the respective ranges.

The rising portion and the falling portion each extend between respective maxima and minima such that they each include blades having values of the geometric parameter both above and below a median value for the set. In this particular example, the median value is 0.12 degrees Further, in this example there is only one rising subset and only one falling subset such that the angular gaps between all neighbouring blades in the patternised set of blades sum to 360° (when the gap is taken from a notional plane of the blade, rather than a surface of a blade having an angular thickness). This may provide for optimal minimisation of the differences in the geometric parameter between adjacent blades, as blades having similar values of the geometric parameter need only be distributed over two such subsets, rather than four or 6. However, in other examples there may be a plurality of rising subsets of blades, and/or a plurality of falling subsets of blades. In such examples, the distribution may resemble two waves (e.g. two sine waves), each comprising a rising portion and a falling portion. In other examples there may be two or more rising subsets and/or falling subset, particularly when it may be desirable to distribute peak values of a particular geometric parameter around the annulus, rather than concentrating them in one azimuthal location.

FIG. 9 is a flow diagram of a method 300 of patternising blades for a rotor, such as a rotor comprising the disc hub 110 and a plurality of blades 120 as schematically shown in FIG. 4.

In block 302, a set of blades are provided, for example by manufacturing a plurality of blades according to a predetermined design, or receiving a set of such blades.

In this example, the number of blades in the set is equal to the number of blade positions in the disc hub. However, in other examples, a superset of blades may be provided including more blades than there are blade positions in a respective disc hub, for example the superset may include enough blades for two or more disc hubs, or may include spare blades in addition to an integer number of sets for respective disc hubs. Providing such a superset may increase the likelihood of obtaining a relatively continuous distribution of any particular geometric parameter, such that blades may be allocated to better minimise intervals between neighbouring blades in one, two or more respective sets of blades for respective disc hubs.

In block 304, a value of a geometric parameter is determined for each blade in the set of blades.

In this particular example, the geometric parameter is hot twist, which may otherwise be referred to as an untwisted stagger angle of a blade corresponding to a centrifugal loading condition.

In this example, the geometric parameter is directly determined rather than simulated. In this example, the geometric parameter is determined by installing the set of blades in respective (unordered) positions in a disc hub to provide an assembled rotor, and rotating the rotor at predetermined conditions to apply aerodynamic and centrifugal loads to each blade. The predetermined conditions may correspond to operational conditions of the rotor. For example, when the rotor is to be installed in a gas turbine engine for use on an aircraft, the operational conditions may correspond to a rotational speed at cruise, climb, or some other phase of flight. Under centrifugal load, the blades tend to untwist such that the twist angle of the blade reduces towards the tip.

In this example, the untwisted stagger angle is determined by installing optical sensors (such as laser sensors) configured to respectively determine when the leading edge of a blade reaches a predetermined position, and when the trailing edge of the blade reaches a predetermined position.

Accordingly, by analysis of the time-correlated positions of the leading edge and trailing edge, the twist angle of each blade can be determined.

In other examples, a geometric parameter such as untwisted stagger angle may be simulated. For example, the geometric parameter may be determined based on one or more predetermined relationships with other geometric or structural parameters of the blade, which may be measured or otherwise determined in an unloaded condition of the blade (i.e. when the blade is not under centrifugal load).

For example, untwisted stagger angle may be determined based on a measured unloaded stagger angle (i.e. cold twist) in conjunction with one or more geometric parameters which relate to the flexural rigidity of the blade. For example, a modal analysis of the blade may be done by monitoring peak frequencies of the blade when subject to an impact. Comparison of the modal analysis with baseline results (e.g. predicted results, averaged results over a plurality of blades, or results relating to a baseline blade having good geometrical and structural compliance to design) may indicate that the blade is more or less flexible than a design flexibility. For example, if the modal analysis reveals a lower second mode frequency than a predetermined second mode frequency (i.e. corresponding to the blade as designed or a manufactured blade having good geometric and structural compliance), this may indicate that the blade has lower flexural rigidity than the blade as designed (a "baseline" blade), such that the blade may tend to untwist more than a baseline blade. Predetermined relationships may be obtained based on empirical analysis or structural simulations (for example, FEA analysis).

In further examples, relationships with other measured parameters may be used, for example based on a thickness of the blade at one or more predetermined measurement points (e.g. at a trailing edge portion, a mean aerodynamic chord, or at a leading edge portion of the blade); a camber line angle at the trailing edge of the blade or the leading edge; or a curvature of a suction surface or pressure surface of the blade.

In block 306, assembly positions for the blades around the disc hub are determined so as to reduce or minimise intervals of the geometric parameter between pairs of neighbouring blades. The positions may be determined using any suitable rules, for example to target a lowest maximum interval, or to target a lowest average interval. The positions may be determined by an optimisation performed by a computer, or may be determined based on more simplistic rules, or even manually to match a wave-shaped profile around the annulus as described with respect to FIG. 8.

In block 308, the blades are installed in the respective allocated positions around the disc hub to provide an assembled rotor. The analysis of the geometric parameter may be repeated to verify the distribution of the geometric parameter around the disc hub.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A bladed disc comprising:
   a disc hub; and
   a set of blades angularly distributed around the disc hub; wherein
   there is variation in a geometric parameter between the blades;
   the blades are positioned around the disc hub such that for a majority of pairs of neighbouring blades in the set, an interval between values of the geometric parameter between the blades of the pair is less than 0.5 standard deviations of the geometric parameter for the set of blades;
   the set of blades comprises a rising subset of at least three neighbouring blades in which there is an increasing trend of the geometric parameter in a first angular direction around the disc hub;
   the set of blades comprises a falling subset of at least three neighbouring blades in which there is a decreasing trend of the geometric parameter in the first angular direction; and
   the rising subset includes a blade having a value of the geometric parameter less than a median value of the geometric parameter in the set of blades and a blade having a value of the geometric parameter more than the median value, and/or the falling subset includes a blade having a value of the geometric parameter less than the median value and a blade having a value of the geometric parameter more than the median value.

2. The bladed disc of claim 1, wherein each blade in the rising subset has a higher value of the geometric parameter than its previous neighbour in the rising subset; and
   wherein each blade in the falling subset has a lower value of the geometric parameter than its previous neighbour in the falling subset.

3. The bladed disc of claim 1, wherein each blade in the set of blades belongs to either a rising subset or a falling subset.

4. The bladed disc of claim 2, wherein there is a single rising subset and a single falling subset in the set of blades, and the angular gaps between all neighbouring blades in the set of blades sum to 360°.

5. The bladed disc of claim 1, wherein a maximum interval in the geometric parameter between two neighbouring blades in the set of blades is 100% or less of a standard deviation of the geometric parameter in the set of blades.

6. The bladed disc of claim 1, wherein the geometric parameter is a stagger angle of the blade.

7. The bladed disc of claim 6, wherein the stagger angle is an untwisted stagger angle corresponding to a centrifugal loading condition of the blade.

8. The bladed disc of claim 1, wherein the geometric parameter is selected from the group consisting of:
   a stagger angle of the blade, such as an untwisted stagger angle corresponding to a centrifugal loading condition of the blade;
   a thickness of the blade at one or more predetermined measurement points, including at a trailing edge portion, at a mean aerodynamic chord, or at a leading edge portion;
   a camber line angle at the trailing edge;
   a camber line angle at the leading edge
   a curvature of a suction surface of the blade;
   a curvature of a pressure surface of the blade.

9. A gas turbine engine comprising a bladed disc of claim 1.

10. A method of assembling a bladed disc, the method comprising the steps of:
    providing a set of blades;
    determining a geometric parameter of each blade of the set of blades;

determining assembly positions around a disc hub for each blade of the set of blades of the plurality, based on the geometric parameter; and assembling each blade of the set of blades in its respective assembly position to provide a bladed disc of claim 1.

11. The method of claim 10, wherein the geometric parameter is determined whilst each respective blade is in a centrifugal loading condition.

12. The method of claim 10, wherein the geometric parameter is determined by modal analysis of the blade.

13. The method of claim 10, wherein the geometric parameter is a simulated geometric parameter of the blade in a centrifugal loading condition, and wherein the simulated geometric parameter is simulated based on a relationship with one or more measured geometric or structural parameters of the blade in an unloaded condition.

14. The method of claim 13, wherein the one or more measured geometric parameters are selected from the group consisting of:
a stagger angle of the blade;
a thickness of the blade at one or more predetermined measurement points including at a trailing edge portion, at a mean aerodynamic chord, or at a leading edge portion;
a camber line angle at the trailing edge;
a camber line angle at the leading edge
a curvature of a suction surface of the blade; and
a curvature of a pressure surface of the blade.

15. The method of claim 10, wherein the geometric parameter is selected from the group consisting of:
a stagger angle of the blade, such as an untwisted stagger angle corresponding to a centrifugal loading condition of the blade;
a thickness of the blade at one or more predetermined measurement points including at a trailing edge portion, at a mean aerodynamic chord, or at a leading edge portion;
a camber line angle at the trailing edge;
a camber line angle at the leading edge
a curvature of a suction surface of the blade; and
a curvature of a pressure surface of the blade.

16. The bladed disc of claim 1, wherein a maximum interval in the geometric parameter between two neighbouring blades in the set of blades is 75% or less of a standard deviation of the geometric parameter in the set of blades.

17. The bladed disc of claim 1, wherein a maximum interval in the geometric parameter between two neighbouring blades in the set of blades is 50% or less of a standard deviation of the geometric parameter in the set of blades.

* * * * *